(12) United States Patent
Li et al.

(10) Patent No.: US 12,465,790 B2
(45) Date of Patent: Nov. 11, 2025

(54) ULTRASONIC TREATMENT TIP AND THERAPEUTIC INSTRUMENT

(71) Applicant: SHENZHEN PENINSULA MEDICAL GROUP, Shenzhen (CN)

(72) Inventors: Yanan Li, Shenzhen (CN); Jian Li, Shenzhen (CN); Yujia Peng, Shenzhen (CN); Shuyun Hu, Shenzhen (CN); Xiaobing Lei, Shenzhen (CN); Yi Ding, Shenzhen (CN)

(73) Assignee: SHENZHEN PENINSULA MEDICAL GROUP, Shenzhen (CN)

( * ) Notice: Subject to any disclaimer, the term of this patent is extended or adjusted under 35 U.S.C. 154(b) by 0 days.

(21) Appl. No.: 18/756,931

(22) Filed: Jun. 27, 2024

(65) Prior Publication Data

US 2024/0342512 A1    Oct. 17, 2024

Related U.S. Application Data

(63) Continuation of application No. PCT/CN2023/096130, filed on May 24, 2023.

(30) Foreign Application Priority Data

May 27, 2022 (CN) .......................... 202221318244.0
May 27, 2022 (CN) .......................... 202221327964.3
Dec. 30, 2022 (CN) .......................... 202223607441.7

(51) Int. Cl.
*A61N 7/02* (2006.01)

(52) U.S. Cl.
CPC ...................................... *A61N 7/02* (2013.01)

(58) Field of Classification Search
None
See application file for complete search history.

(56) References Cited

U.S. PATENT DOCUMENTS 6,763,720 B1 *  7/2004  Jacobsen ................. G01S 11/16
                                                                 73/602
2019/0134430 A1 *  5/2019  Jeong ....................... A61N 7/02
(Continued)

FOREIGN PATENT DOCUMENTS

CN          203227214 U     10/2013
CN          213347509 U      6/2021
(Continued)

OTHER PUBLICATIONS

International Search Report and Written Opinion issued in corresponding PCT Application No. PCT/CN2023/096130, dated Sep. 26, 2023.

*Primary Examiner* — Yi-Shan Yang
(74) *Attorney, Agent, or Firm* — Westbridge IP LLC

(57) ABSTRACT

Disclosed are an ultrasonic treatment tip and a therapeutic instrument. The ultrasonic treatment tip includes: a shell provided with a first sound-transmitting hole, and the first sound-transmitting hole being covered with a sound-transmitting membrane; a cover fixed to the shell, and the cover and the sound-transmitting membrane jointly forming a sealed accommodation cavity; an ultrasonic transducer provided at the accommodation cavity, and a sound emitter of the ultrasonic transducer facing the first sound-transmitting hole; and a buffer member provided at the accommodation cavity, the buffer member and an inner surface of the accommodation cavity being enclosed to form a buffer chamber, and the buffer chamber being configured to offset a pressure change in the accommodation cavity when the sound emitter is working.

17 Claims, 10 Drawing Sheets

(56) References Cited

U.S. PATENT DOCUMENTS

2020/0281564 A1\* 9/2020 Takahashi ............ A61B 8/4461
2021/0045711 A1\* 2/2021 Brattain ............... A61B 8/0875

FOREIGN PATENT DOCUMENTS

| CN | 213374811 U | \* | 6/2021 |
| CN | 217745387 U | | 11/2022 |
| CN | 217745388 U | | 11/2022 |
| KR | 20170126418 | \* | 11/2017 |
| KR | 20170126418 A | | 11/2017 |

\* cited by examiner

ULTRASONIC TREATMENT TIP AND THERAPEUTIC INSTRUMENT

CROSS-REFERENCE TO RELATED APPLICATIONS

This application is a continuation application of International Application No. PCT/CN2023/096130, filed on May 24, 2023, which claims priority to Chinese Patent Application No. 202223607441.7, filed on Dec. 30, 2022, Chinese Patent Application No. 202221327964.3, filed on May 27, 2022, and Chinese Patent Application No. 202221318244.0, filed on May 27, 2022. The disclosures of the above-mentioned applications are incorporated herein by reference in their entireties.

TECHNICAL FIELD

The present application relates to the technical field of medical devices, and in particular to an ultrasonic treatment tip and a therapeutic instrument.

BACKGROUND

In ultrasonic treatment, the ultrasonic treatment tip is an important part of the therapeutic instrument, which mainly converts electrical-acoustic signals by the ultrasonic transducer, and then the sound waves generated after conversion are emitted to the human body via the probe treatment window to achieve treatment purposes.

In order to ensure the normal operation of the ultrasonic transducer, a sound-conducting medium is installed in the probe to absorb the heat generated by the ultrasonic transducer during its working process to avoid the ultrasonic transducer from being burned out. However, the sound-conducting medium absorbs heat and expands, and it is easy to rupture the sound-transmitting membrane, thus causing damage to the ultrasonic treatment tip, thereby reducing the service life and performance of the ultrasonic treatment tip.

SUMMARY

The main purpose of the present application is to provide an ultrasonic treatment tip, which intends to extend the service life of the ultrasonic treatment tip and improves the safety of the ultrasonic treatment tip.

In order to achieve the above purpose, the ultrasonic treatment tip proposed by the present application includes:
an outer shell including a workspace and a first sound-guiding hole;
an inner cover provided with an assembly hole;
an inner shell provided with a second sound-guiding hole and a connecting end, the inner cover is fixedly connected to the connecting end and configured to limit a compartment with the inner shell, and the first sound-guiding hole and the second sound-guiding hole are configured to form a sound-guiding channel;
a sound-guiding membrane covering the second sound-guiding hole; and
a buffer member, defining a buffer cavity, the buffer member is protrudable in the compartment; the buffer member has an opening, and the opening is fixedly connected to the assembly hole; the buffer cavity is communicable with the workspace via the opening;
the compartment is provided with an ultrasonic transducer and is filled with a sound medium; a distance is provided between the ultrasonic transducer and the second sound-guiding hole, and the sound-transmitting channel is configured to transmit sound waves generated by the ultrasonic transducer; and
the inner cover, the inner shell, the sound-guiding membrane and the buffer are provided in the workspace.

In an embodiment, the buffer member includes one or more pleated structures.

In an embodiment, the buffer member includes silicone material.

In an embodiment, the buffer member includes a first flange, and the first flange encircles the opening; and the first flange is fixedly connected to a periphery of the assembly hole.

In an embodiment, the first flange is connected to a surface of the inner cover facing away from a side of the compartment.

In an embodiment, the inner cover is provided with a limiting groove surrounding the assembly hole, and the limiting groove is configured to place the first flange.

In an embodiment, a surface of the first flange abutting against the inner cover is provided with an elastic sealing ring protrusion.

In an embodiment, the ultrasonic treatment tip includes a pressing piece configured to press the first flange and fixedly connected to the inner cover; the pressing piece is further provided with an outlet hole; the outlet hole is connected to the assembly hole and the opening, and the outlet hole is configured to communicate with the buffer cavity and the workspace.

In an embodiment, the ultrasonic treatment tip further includes a sealing ring; and the inner shell includes a second flange provided around the connecting end, the sealing ring is provided at the second flange, and the inner cover is configured to press the sealing ring and is fixedly connected to the second flange.

The present application further proposes an ultrasonic treatment tip, including:
a shell provided with a first sound-transmitting hole;
a sound-transmitting membrane, providing coverage of the first sound-transmitting hole; and
a cover, fixedly coupled with the shell;
the cover the sound-transmitting membrane and the shell are configured to jointly form a sealed accommodation cavity;
an ultrasonic transducer provided in the accommodation cavity, a sound emitter of the ultrasonic transducer being faced with the first sound-transmitting hole; and
a compensator provided in the accommodation cavity, being protrudable from an inner surface of the accommodation cavity to the sound-transmitting membrane, configured to adjust internal pressure changes in the accommodation cavity when the sound emitter is working.

In an embodiment, the compensator is an elastic membrane, and the elastic membrane is fixedly connected to the inner surface of the accommodation cavity and configured to form a sealed buffer chamber with the inner surface of the accommodation cavity; the elastic membrane is configured to deform and squeeze air in the buffer chamber when the internal pressure in the accommodation cavity changes.

In an embodiment, the compensator is an elastic membrane; the inner surface of the accommodation cavity is provided with a channel communicable with external environment, and the elastic membrane is fixedly connected to the inner surface of the accommodation cavity and configured to form a buffer chamber communicable with the channel; the elastic membrane is configured to deform and squeeze the air in the buffer chamber to outside when the internal pressure in the accommodation cavity changes.

In an embodiment, an elastic coefficient of the elastic membrane is smaller than an elastic coefficient of the sound-transmitting membrane.

In an embodiment, the compensator is provided in the accommodation cavity away from the first sound-transmitting hole.

In an embodiment, the shell includes an inner shell and an outer shell fixedly connected with each other; the inner shell is connected to the compensator and is sealedly connected to the cover, and the outer shell is sleeved on outside the inner shell.

In an embodiment, a sealing ring is clamped between the inner shell and the cover.

In an embodiment, the cover includes a bottom cover and a top cover fixedly connected with each other, and the bottom cover is sealedly connected to the inner shell; an installation cavity formed by the connection of the top cover and the bottom cover is provided with a circuit board, and the circuit board is electrically connected to the ultrasonic transducer.

In an embodiment, the ultrasonic treatment tip further includes a bracket, that has one end fixedly connected to the cover and the other end fixedly connected to the ultrasonic transducer.

The present application further proposes an ultrasonic treatment tip, including:
- a housing, provided with a first sound-conducting hole;
- a sound-conducting membrane, providing coverage of the first sound-conducting hole;
- a cap, fixedly coupled with the housing;
- the cap, the sound-conducting membrane and the housing are configured to jointly form a sealed reservoir;
- an ultrasonic transducer, provided in the reservoir, the ultrasonic transducer having a sound emitter being faced with the first sound-conducting hole; and
- a compensator, provided on one of the housing and the cap, configured to adjust internal pressure changes in the reservoir when the sound emitter is working.

In an embodiment, the compensator includes a through hole and an elastic membrane; the elastic membrane is configured to cover the through hole, and the elastic membrane is configured to deform when the internal pressure in the reservoir changes.

In an embodiment, the through hole is provided at the shell and is provided away from the first sound-transmitting hole.

In an embodiment, the shell includes an inner shell and an outer shell fixedly connected to the inner shell, the inner shell is provided with the through hole, the inner shell is sealed and fixed with the cover, and the outer shell is sleeved at an outside of the inner shell.

In an embodiment, the through hole is opened on the cap.

In an embodiment, the cap is provided with an injection hole; the injection hole is pluggable with a sealing plug, and the through hole is opened on the sealing plug.

In an embodiment, the sealing plug includes a plug body, a supporting frame is provided on an outer periphery of the plug body, and the through hole is opened on the plug body; the supporting frame is sealedly connected to the injection hole; and
a surface of the supporting frame is coated with an elastic layer.

In an embodiment, the compensator includes an elastic membrane; the elastic membrane is provided in the housing and is fixedly connected to the cap, and the elastic membrane, the cap and the sound-conducting membrane are enclosed to form the reservoir.

In an embodiment, the cap is further provided with a compensation hole; the compensator includes an elastic membrane; the elastic membrane is sealedly connected to the compensation hole; the elastic membrane, the cap and the sound-conducting membrane are enclosed to form the reservoir.

The present application further proposes a therapeutic instrument including the aforementioned ultrasonic treatment tip, and a handle detachably connected to the aforementioned ultrasonic treatment tip.

In the technical solutions of the present application, by providing a scalable buffer member with a buffer cavity in an accommodation cavity provided with an ultrasonic transducer and filled with sound-conducting medium, a buffer space for the volume expansion of the sound-conducting medium is indirectly provided. Furthermore, the accommodation cavity is separated by a buffer member and forms a buffer chamber with the inner surface of the accommodation cavity, one of the shell and the cover is provided with a compensator, so as to offset the pressure change in the accommodation cavity when the sound emitter 201 is working. In this way, it can prevent the pressure in the accommodation cavity from acting concentratedly on the sound-transmitting membrane and causing the sound-transmitting membrane to be damaged, thereby extending the service life of the ultrasonic treatment tip, and improving the use safety of the ultrasonic treatment tip and the effectiveness of ultrasound therapy.

BRIEF DESCRIPTION OF THE DRAWINGS

In order to explain the embodiments of the present application or the technical solutions in the existing technology more clearly, the accompanying drawings needed to be used in the description of the embodiments or the existing technology will be briefly introduced below. Obviously, the accompanying drawings in the following description are only some embodiments of the present application, other accompanying drawings can be obtained based on the provided accompanying drawings without exerting creative efforts for those skilled in the art.

Figure 1:
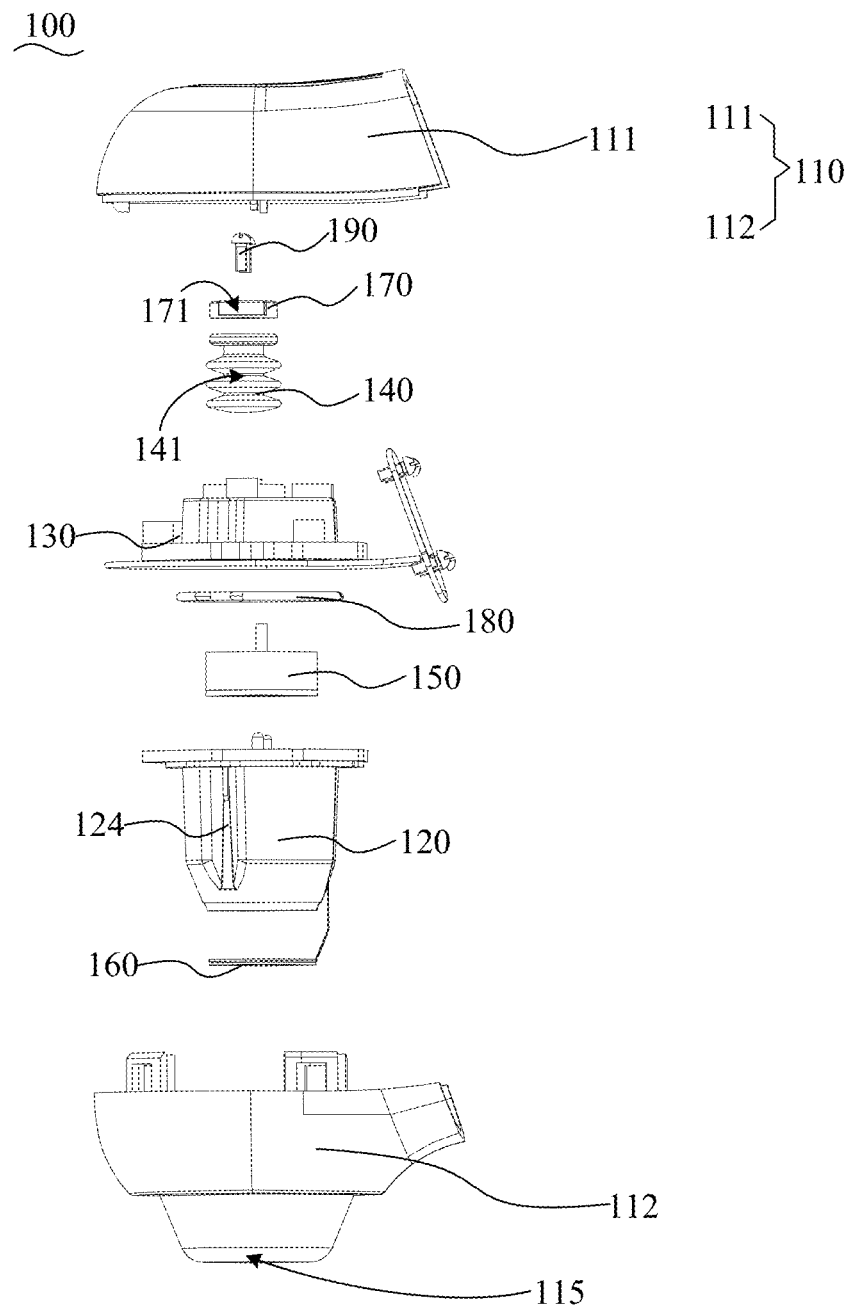
FIG. 1 is a structural exploded view of an ultrasonic treatment tip according to an embodiment of the present application.

The realization of the purpose, functional features and advantages of the present application will be further described in conjunction with the embodiments and with reference to the accompanying drawings.

DETAILED DESCRIPTION OF THE EMBODIMENTS

The technical solutions in the embodiments according to the present application will be clearly and completely described below in conjunction with the accompanying drawings in the embodiments according to the present application, and it is clear that the described embodiments are only a part of the embodiments according to the present application, and not all of the embodiments. Based on the embodiments in the present application, all other embodiments obtained by those skilled in the art without making creative labor fall within the scope of the present application.

It should be noted that in the embodiment of the present application, all directional indications (such as up, down, left, right, front, back or the like) are only used to explain the relative positional relationship, movement and so on between various components in a specific posture (as shown in the accompanying drawings). If the specific posture changes, the directional indication will also change accordingly.

In the present application, unless otherwise clearly stated and limited, the terms "connection", "fixed" and so on should be understood in a broad sense. For example, "connection" can be a fixed connection, a detachable connection or an integral body; it can be a mechanical connection or an electrical connection; it can be a direct connection or an indirect connection through an intermediate medium; it can be contact, or an internal connection between two components, or the interaction between two components, unless otherwise clearly limited. For those skilled in the art, the specific meanings of the above terms in the present application can be understood according to the specific circumstances.

In addition, in the embodiment of the present application, if there are descriptions involving "first", "second" or the like, the descriptions of "first", "second" or the like are only for descriptive purposes and cannot be understood as indicating or implying the relative importance or implicitly indicating the quantity of the technical features indicated. Therefore, features defined as "first" and "second" may explicitly or implicitly include at least one of these features. In addition, the meaning of "and/or" appearing in the entire text includes three parallel solutions, taking "A and/or B" as an example, it includes solution A, or solution B, or a solution that satisfies both A and B at the same time. In addition, the technical solutions of various embodiments can be combined with each other, but it is based on that those skilled in the art can realize. When the combination of technical solutions is contradictory or cannot be realized, it should be considered that such combination of technical solutions does not exist and is not within the protection scope claimed by the present application.

In the technical solutions of the present application, by providing a scalable buffer member with a buffer cavity in an compartment provided with an ultrasonic transducer and filled with sound-conducting medium of an ultrasonic treatment tip, a buffer space for the volume expansion of the sound-conducting medium is indirectly provided, thereby avoiding damage to the sound-transmitting membrane caused by the heat-absorbing expansion of the sound-conducting medium, improving the use safety of the ultrasonic treatment tip, and extending the service life of the ultrasonic treatment tip.

Referring to FIG. 1 to FIG. 4, in an embodiment of the present application, the ultrasonic treatment tip 100 includes:
- an outer shell 110 including a workspace 114 and a first sound-guiding hole 115;
- an inner cover 130 provided with an assembly hole 131;
- an inner shell 120 provided with a second sound-guiding hole 121 and a connecting end 122, the inner cover 130 is fixedly connected to the connecting end 122 and limits a compartment with the inner shell 120, and the first sound-guiding hole 115 and the second sound-guiding hole 121 form a sound-guiding channel;
- a sound-guiding membrane 160 covering the second sound-guiding hole 121; and
- a buffer member 140, defining a buffer cavity 141, the buffer member 140 is protrudable in the compartment; the buffer member 140 has an opening 142, the opening 142 is fixedly connected to the assembly hole 131, and buffer cavity is communicable with the workspace via the opening 142;
- the compartment is provided with an ultrasonic transducer 150 and is filled with a sound-conducting medium, a distance is provided between the ultrasonic transducer 150 and the second sound-guiding hole 121, and the sound-guiding channel is configured to transmit sound waves generated by the ultrasonic transducer 150; and the inner cover 130, the inner shell 120, the sound-guiding membrane 160 and the buffer 140 are provided in the workspace 114.

In an embodiment, when the ultrasonic transducer 150 is working, the sound-conducting medium will expand due to absorbing the heat generated by the ultrasonic transducer 150, thereby squeezing the buffer member 140, its buffer cavity 141 is reduced in volume and the gas in the cavity is discharged to the aforementioned workspace 114 via the opening 142 and the assembly hole 131. The reduction in the volume of the buffer member 140 provides a buffer space for the compartment to accommodate the expansion volume of the sound-conducting medium, thereby preventing the sound-conducting medium from expanding and crushing the sound-guiding membrane 160, and prolonging the service life of the ultrasonic treatment tip 100.

There needs to be a certain distance between the ultrasonic transducer 150 and the second sound-guiding hole 121 for the sound waves to converge and transmit. On the one hand, it is to ensure that the sound waves emitted by the ultrasonic transducer 150 accurately hit the patient's area to be treated after being emitted from the probe. On the other hand, it is to avoid sound waves that are too high in energy and may burn the patient during treatment. Part of the sound wave energy is consumed by the distance provided between the ultrasonic transducer 150 and the second sound-guiding hole 121, thus improving the use safety of probe.

Figure 2:
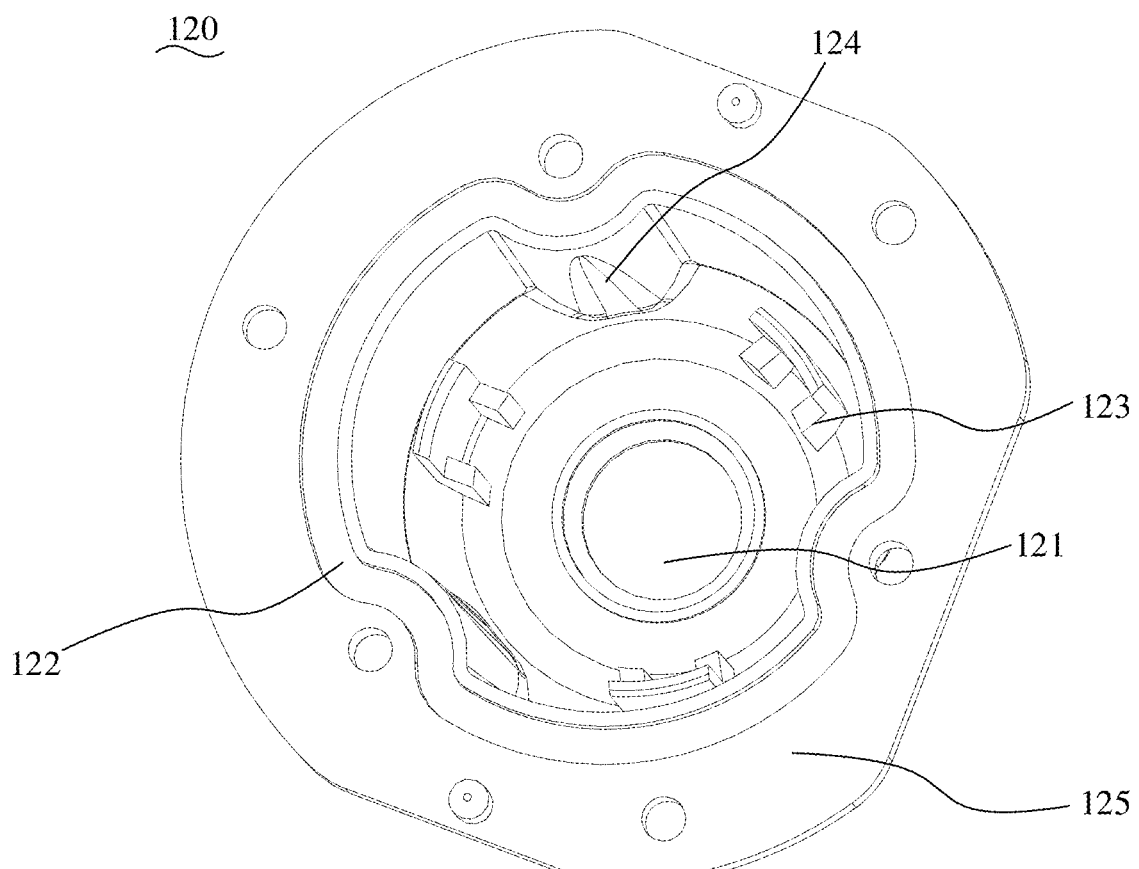
FIG. 2 is a structural schematic view of the inner shell in FIG. 1.

Furthermore, in an embodiment, the inner shell 120 is provided with one or more card holders 123, and the card holders 123 are distanced from the second sound-guiding hole 121. The card holder 123 is fixedly connected to the ultrasonic transducer 150, and has a limiting effect on the ultrasonic transducer 150. In an embodiment, the inner shell 120 is further provided with one or more avoidance grooves 124 configured for placing the ultrasonic transducer 150. As shown in FIG. 2, the avoidance groove 124 is located above the card holder 123 and is provided at the inner periphery of the inner shell 120, thus preventing the ultrasonic transducer 150 from being limited by the inner shell 120 due to its excessive size; at the same time, it also has a certain limiting effect on the ultrasonic transducer 150.

Please referring to FIG. 1, the above outer shell 110 can be divided into two parts, that is, the upper outer shell 111 and the lower outer shell 112. The two parts are fixedly connected by the card slot structure 113. This connection method is more convenient for the installation of components in the workspace 114. The above-mentioned cover is further provided with a threading hole 132 and a injection hole 133. The threading hole 132 is configured to thread the wires configured to connect the ultrasonic transducer 150 to the outside, moreover, after the wires are threaded, the threading hole 132 is sealed by injecting glue, filling, etc. The injection hole 133 is configured to inject or discharge the sound-conducting medium. The inner cover 130 is further provided with a sealing plug 134 configured to seal the injection hole 133, so as to prevent that the sound-conducting medium absorbs heat and expands to overflow via the threading hole 132 or the sealing hole during the operation of the ultrasonic transducer 150, thus corroding other components in the workspace 114 and damaging the probe.

In an embodiment, the buffer member 140 includes one or more pleated structures. In the working state of the ultrasonic transducer 150, the sound-conducting medium expands due to absorbing the heat generated by the ultrasonic transducer 150, thereby compressing the buffer member 140. In the non-working state of the ultrasonic transducer 150, the temperature of the sound-conducting medium recovers, and the buffer member 140 is no longer compressed and gradually returns to its original shape. By providing one or more pleated structures at the buffer member 140, it is more conducive for the buffer member 140 to achieve the effect of "contraction under pressure, recovery without pressure". The buffer member 140 made of non-elastic material can also achieve the above effect by the pleated structure, thus reducing the material requirements for the buffer member 140, and reducing the material cost.

Specifically, in another embodiment, the buffer member 140 is configured as an elastic material, such as rubber. The buffer member 140 made of this material can achieve the effect of "compression under pressure, recovery without pressure", and can stably exert its effect in the the ultrasonic treatment tip 100 and extend the service life of the ultrasonic treatment tip 100.

Specifically, in an embodiment, the buffer member 140 is configured as silicone material. The processing technology of silicone material is mature, which is helpful to reduce the material cost and processing cost. The silicone buffer member 140 with pleated structure has elastic deformation ability and will not be unable to return to its original shape due to expansion and compression of the sound-conducting medium. On the other hand, silicone material is heat-resistant. When the sound-conducting medium heats up, the buffer member 140 of silicone material will not deform or melt when heated, and has anti-aging ability, which can function continuously and stably in the ultrasonic treatment tip 100 to extend the service life of the ultrasonic treatment tip 100.

Figure 4:
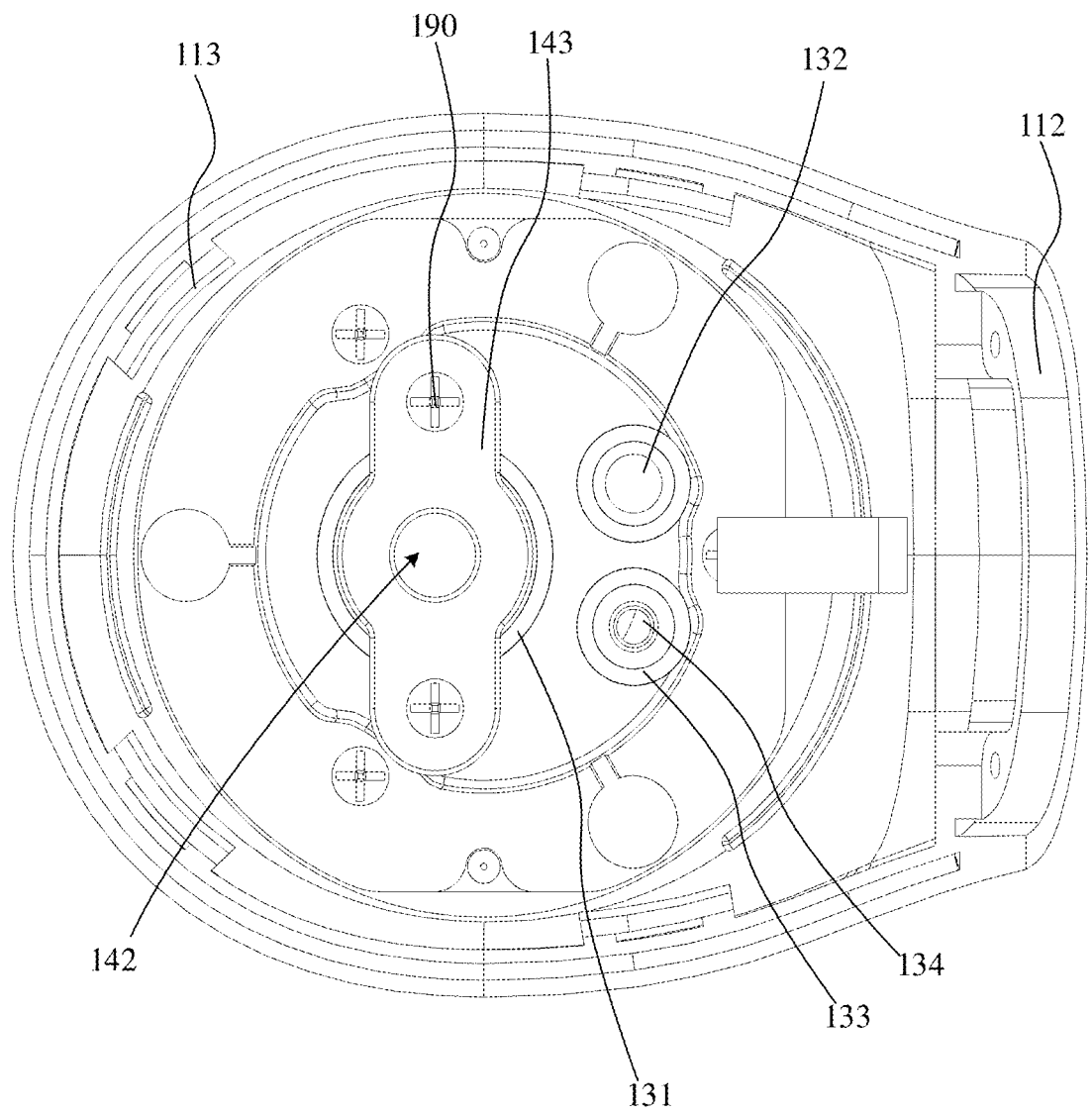
FIG. 4 is a structural schematic view of the top view of the ultrasonic treatment tip with the outer shell removed shown in FIG. 1.

In an embodiment, please referring to FIG. 4, the buffer member 140 includes a first flange 143, and the first flange 143 encircles the opening 142. The first flange 143 is fixedly connected to a periphery of the assembly hole 131. The first flange 143 provides a larger contact area for connecting the periphery of the assembly hole 131. On the one hand, it guarantees the stability of the connection between the buffer member 140 and the inner cover 130. On the other hand, the sealing performance between the buffer room and the inner cover 130 is ensured, and the sound-conducting medium is prevented from expanding and overflowing the compartment, and then flowing into the workspace 114, thereby corroding internal components and damaging the ultrasonic treatment tip 100.

Referring to this embodiment, the first flange 143 and the periphery of the assembly hole 131 are fixedly connected by screws 190. It can be understood that the first flange 143 and the periphery of the assembly hole 131 can be fixedly connected by bonding, snapping or other means.

Furthermore, in an embodiment, the first flange 143 is connected to a surface of the inner cover 130 facing away from a side of the compartment. The inner cover 130 and the inner shell 120 are fixedly connected to limit the compartment, and the buffer member 140 is inserted into the compartment via the assembly hole 131 provided by the inner cover 130. The first flange 143 is connected to the surface on the side away from the compartment, so that the buffer member 140 and the inner cover 130 are fixedly connected. The buffer member 140 is placed in the compartment by inserting for easier operation. Moreover, the inner shell 120 and the inner cover 130 are first fixedly connected, the limited compartment has a protective effect on the ultrasonic transducer 150, thus avoiding bumping the ultrasonic transducer 150 during the installation process and causing the ultrasonic transducer 150 to fail, thereby protecting the efficacy of the ultrasonic treatment tip 100.

Based on the above embodiment, the inner cover 130 is provided with a limiting groove 135 surrounding the assembly hole 131, and the limiting groove 135 is configured to place the first flange 143. During the usage process of the ultrasonic treatment tip 100, the sound-conducting medium may expand irregularly due to uneven heating, thus causing uneven force on the buffer member 140 to cause distortion or even shaking. By the limiting groove 135 provided at the periphery of the assembly hole 131, the buffer member 140 can be prevented from excessive shaking when the force is unevenly applied. At the same time, the setting of the limiting groove 135 can retain the overflowing sound-conducting medium in the groove, thereby enhancing the sealing effect between the inner cover 130 and the buffer member 140.

Figure 9:
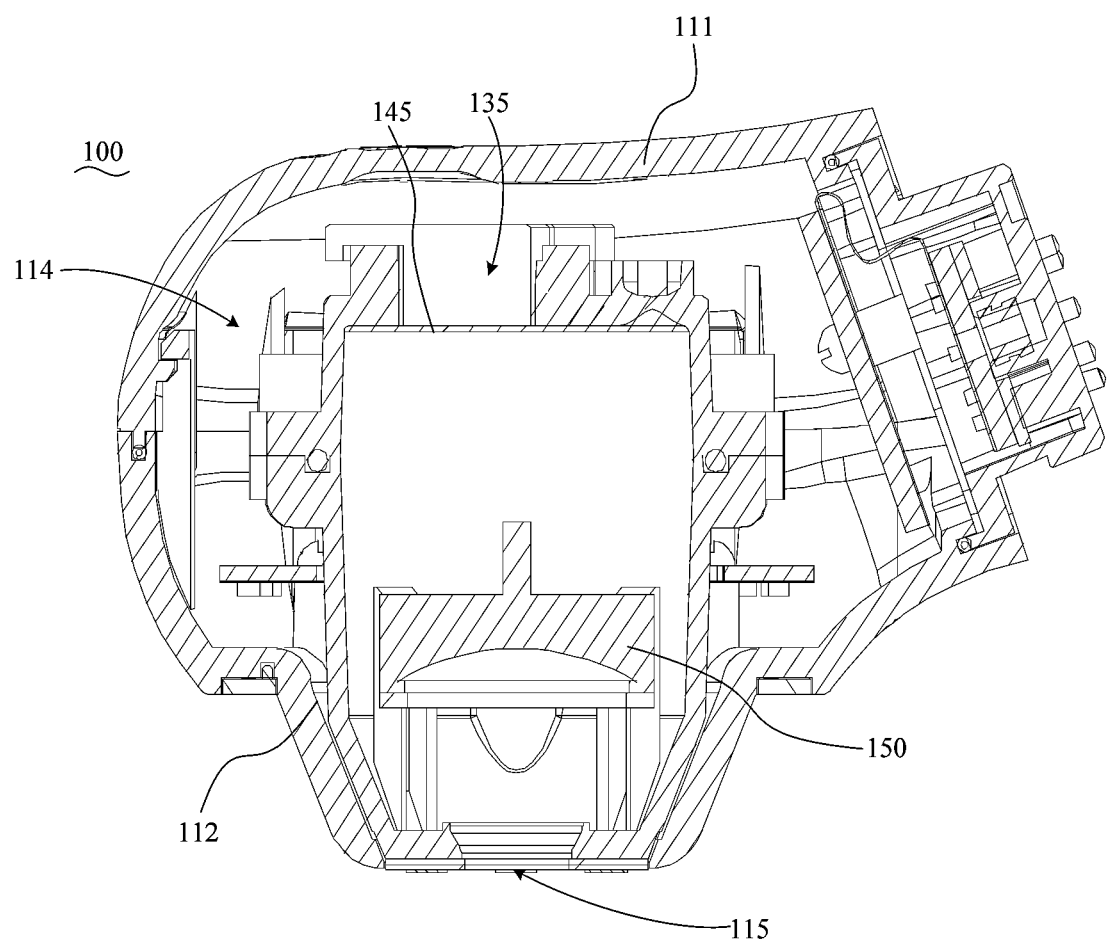
FIG. 9 is a structural cross-sectional view of another ultrasonic treatment tip shown in FIG. 1.

In an embodiment, as shown in FIG. 9, the buffer member 140 includes a waterproof and gas-penetration membrane 145. The waterproof and gas-penetration membrane 145 is used to seal the limiting groove 135 to prevent moisture from entering the limiting groove 135, and at the same time, ensuring the air circulation between the limiting groove 135 and the outside. When the sound-guiding medium expands and compresses the air in the internal space of the transducer, the generated high-pressure gas can be discharged to the outside via the waterproof and gas-penetration membrane 145. Further, the waterproof and gas-penetration membrane 145 is connected to the groove wall of the limiting groove 135 by adhesion or other means.

Figure 10:
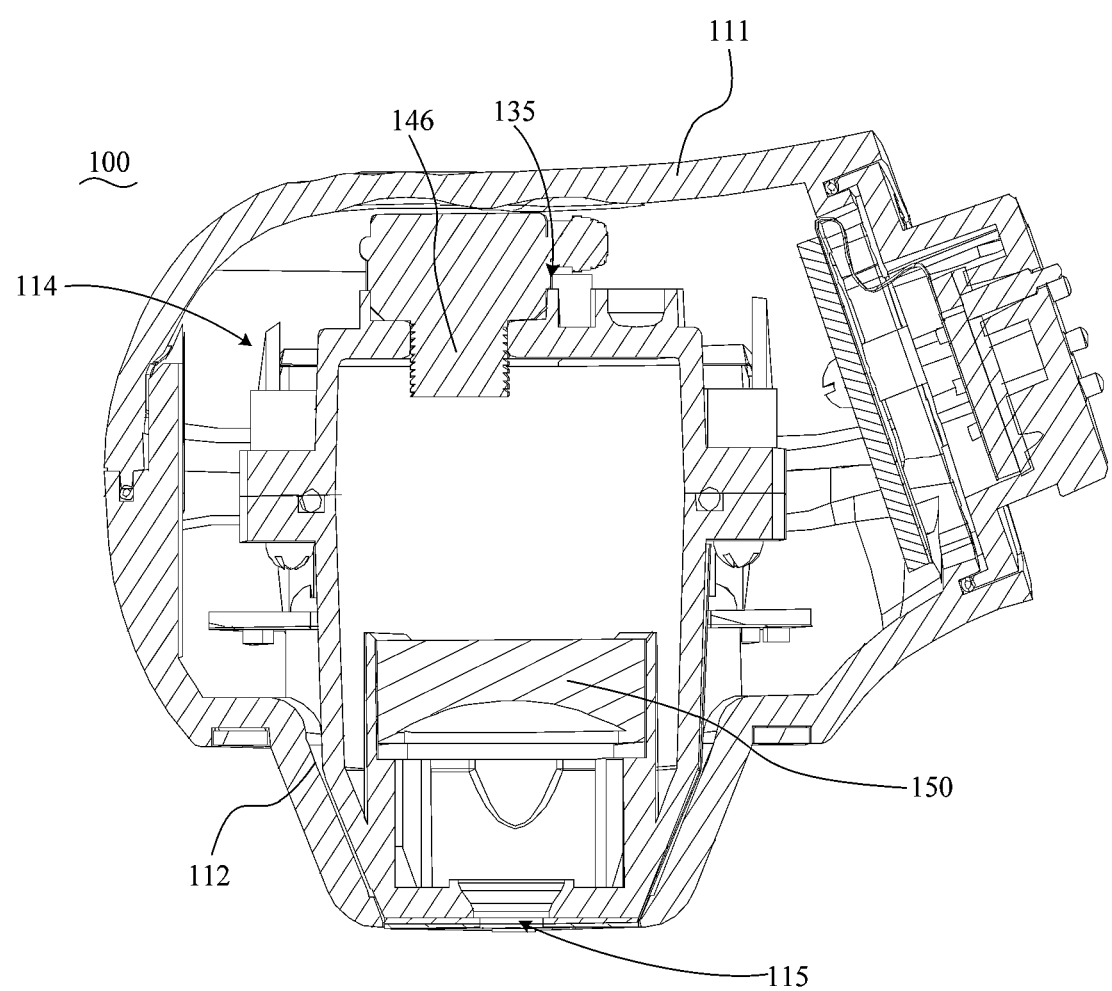
FIG. 10 is a structural cross-sectional view of yet another ultrasonic treatment tip shown in FIG. 1.

In an embodiment, as shown in FIG. 10, the buffer member 140 includes a micro pressure relief valve 146, and the micro pressure relief valve 146 is disposed in the limiting groove 135. The micro pressure relief valve 146 is used to seal the limiting groove 135 and automatically adjust the pressure within the transducer. Further, the micro pressure relief valve 146 is provided with external threads, and the inner wall of the limiting groove 135 is provided with internal threads. The micro pressure relief valve 146 and the limiting groove 135 are detachably connected by the engagement of the external threads and the internal threads. In an embodiment, the micro pressure relief valve 146 and the limiting groove 135 can also be fixedly connected.

Figure 11:
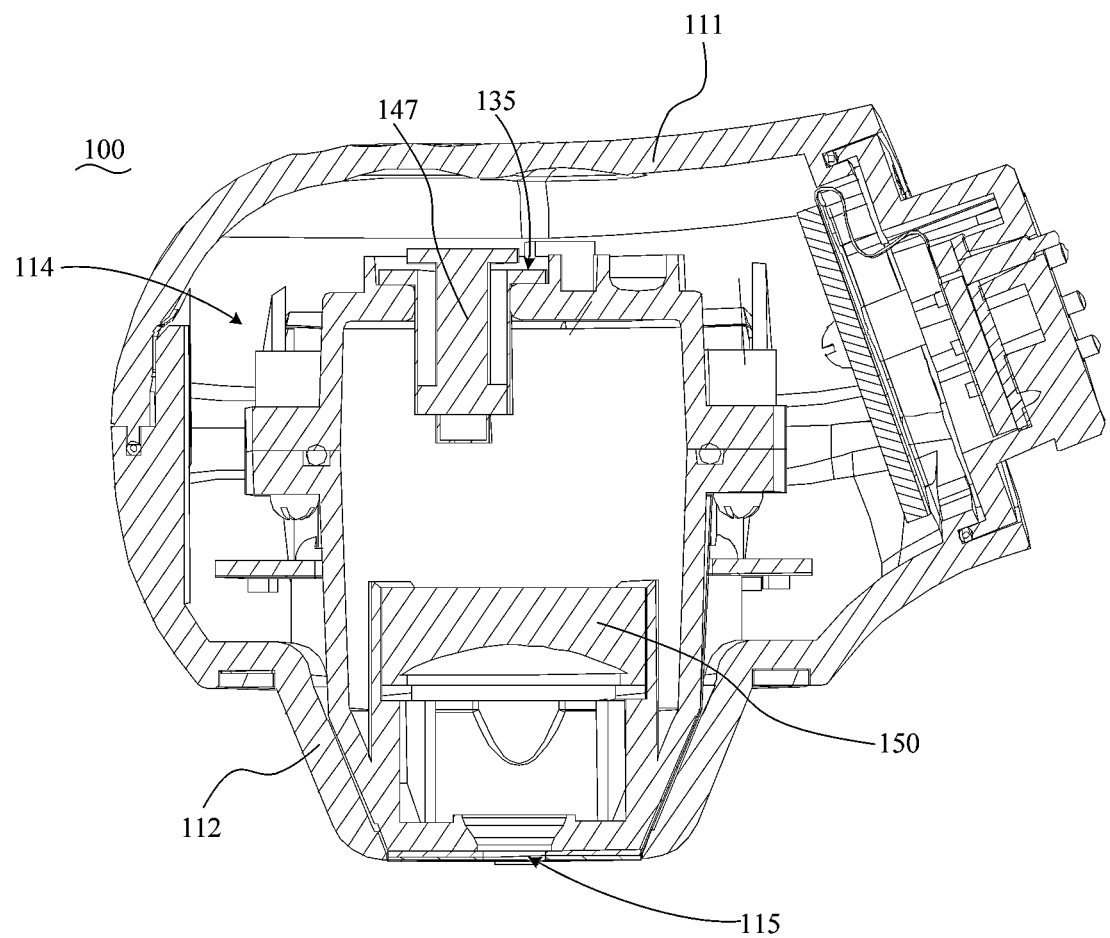
FIG. 11 is a structural cross-sectional view of yet another ultrasonic treatment tip shown in FIG. 1.

In an embodiment, as shown in FIG. 11, the buffer member 140 includes a column-shaped pressure piston 147, and the column-shaped pressure piston 147 is disposed in the limiting groove 135. The column-shaped pressure piston 147 is used to adjust the pressure in the transducer. When the pressure in the transducer is high, the column-shaped pressure piston 147 moves upward. When the pressure in the transducer is small, the column-shaped pressure piston 147 moves downward, so as to prevent the transducer from being damaged due to excessive pressure in the transducer. Specifically, the column-shaped pressure piston 147 is sleeved on the inner wall of the limiting groove 135.

Figure 3:
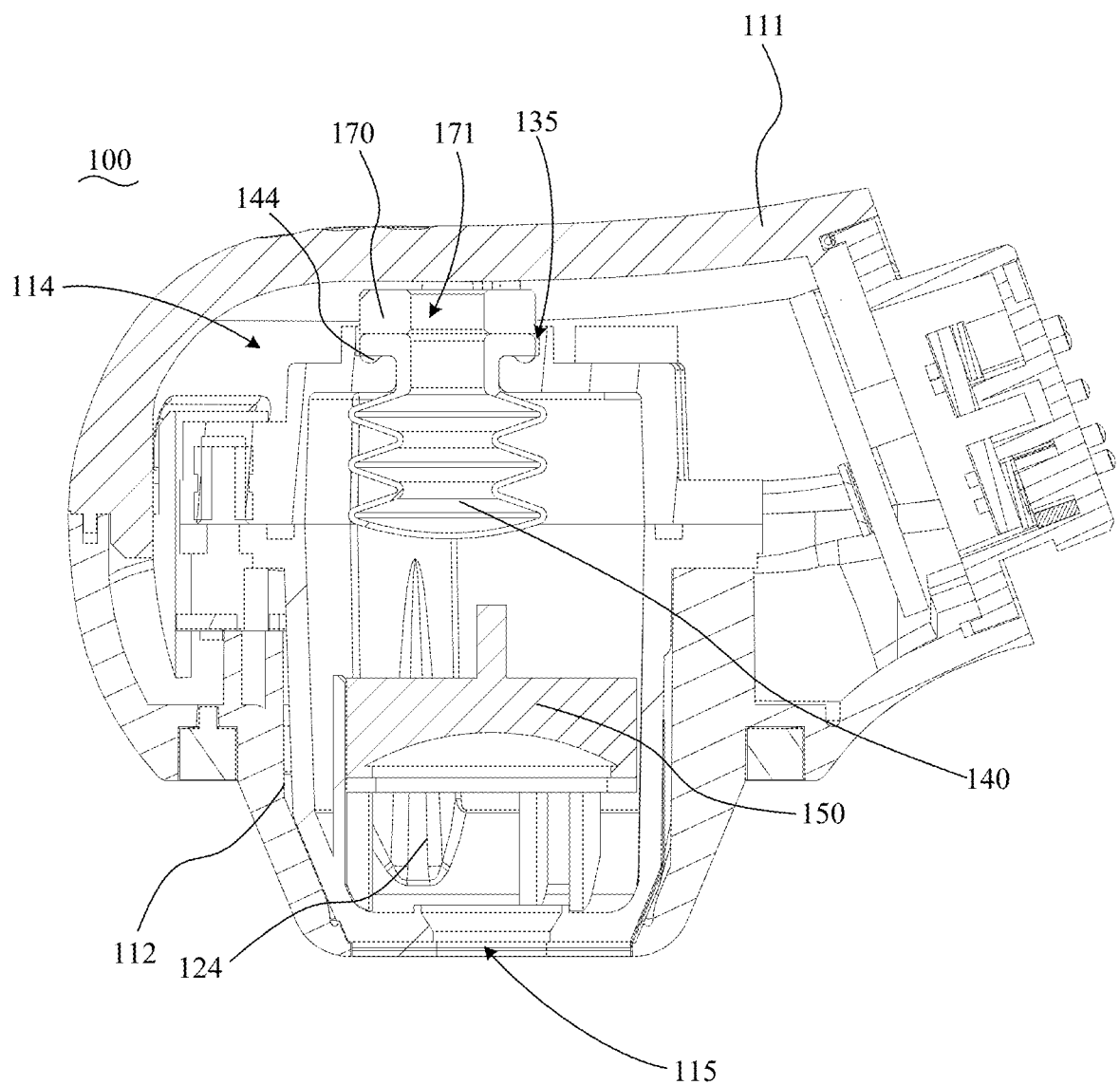
FIG. 3 is a structural cross-sectional view of the ultrasonic treatment tip shown in FIG. 1.

Furthermore, the limiting groove 135 shown in FIG. 3 can be adapted to the first flange 143, or there is an interference connection between the limiting groove 135 and the first flange 143. When the sound-conducting medium expands and compresses the buffer member 140, the buffer member 140 can be stably connected to the inner cover 130 by the interaction between the periphery of the first flange 143 and the periphery of the limiting groove 135.

Furthermore, based on the above embodiment, a surface of the first flange 143 abutting against the inner cover 130 is provided with an elastic sealing ring protrusion 144. The buffer member 140 and the inner cover 130 are fixedly connected, and the first flange 143 squeezes the elastic sealing ring protrusion 144 to enhance the sealing performance between the buffer member 140 and the inner cover 130. At the same time, it also increases the friction between the buffer member 140 and the inner cover 130, thus making the connection between the buffer member 140 and the inner cover 130 more stable.

Furthermore, in an embodiment, in order to enhance the sealing performance and connection stability between the buffer member 140 and the inner cover 130, the ultrasonic treatment tip 100 includes a pressing piece 170, the pressing piece 170 is configured to press the first flange 143, and the pressing piece 170 is fixedly connected to the inner cover 130. The pressing piece 170 is further provided with an outlet hole 171, the outlet hole 171 is connected to the assembly hole 131 and the opening 142, and the outlet hole 171 is configured to communicate with the buffer cavity 141 and the workspace 114.

Furthermore, in an embodiment, in order to enhance the sealing performance of the compartment, the ultrasonic treatment tip 100 further includes a sealing ring 180, the inner shell 120 includes a second flange 125 provided around the connecting end 122, the sealing ring 180 is provided at the second flange 125, and the inner cover 130 is configured to press the sealing ring 180 and is fixedly connected to the second flange 125.

Figure 5:
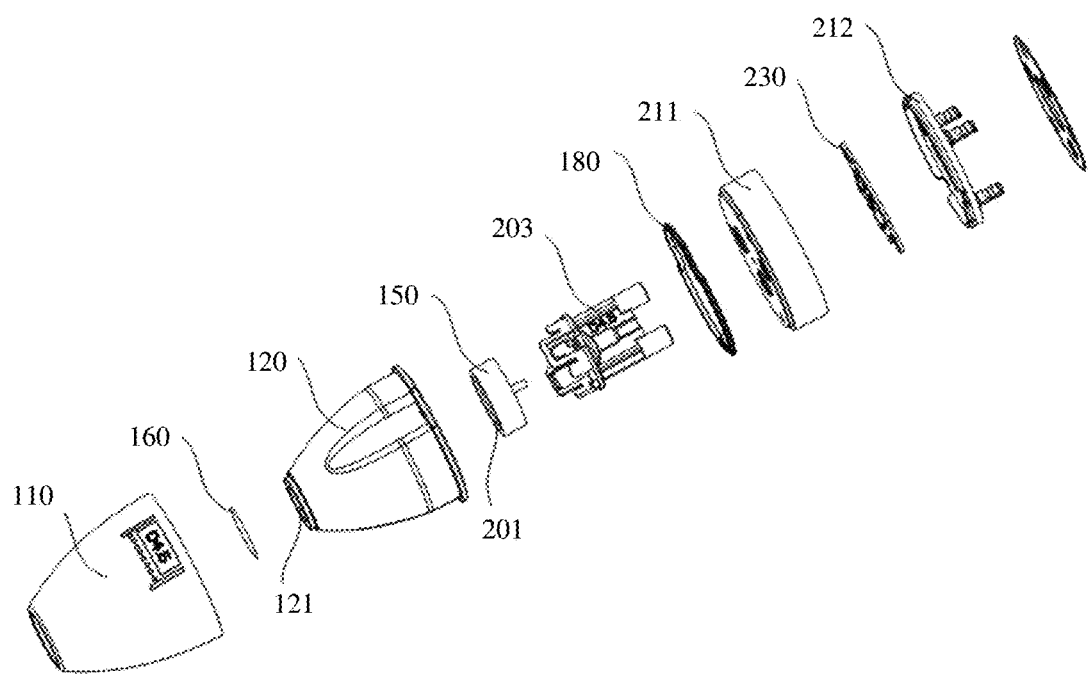
FIG. 5 is a structural schematic view of a cover in the ultrasonic treatment tip according to another embodiment of the present application.
Figure 6:
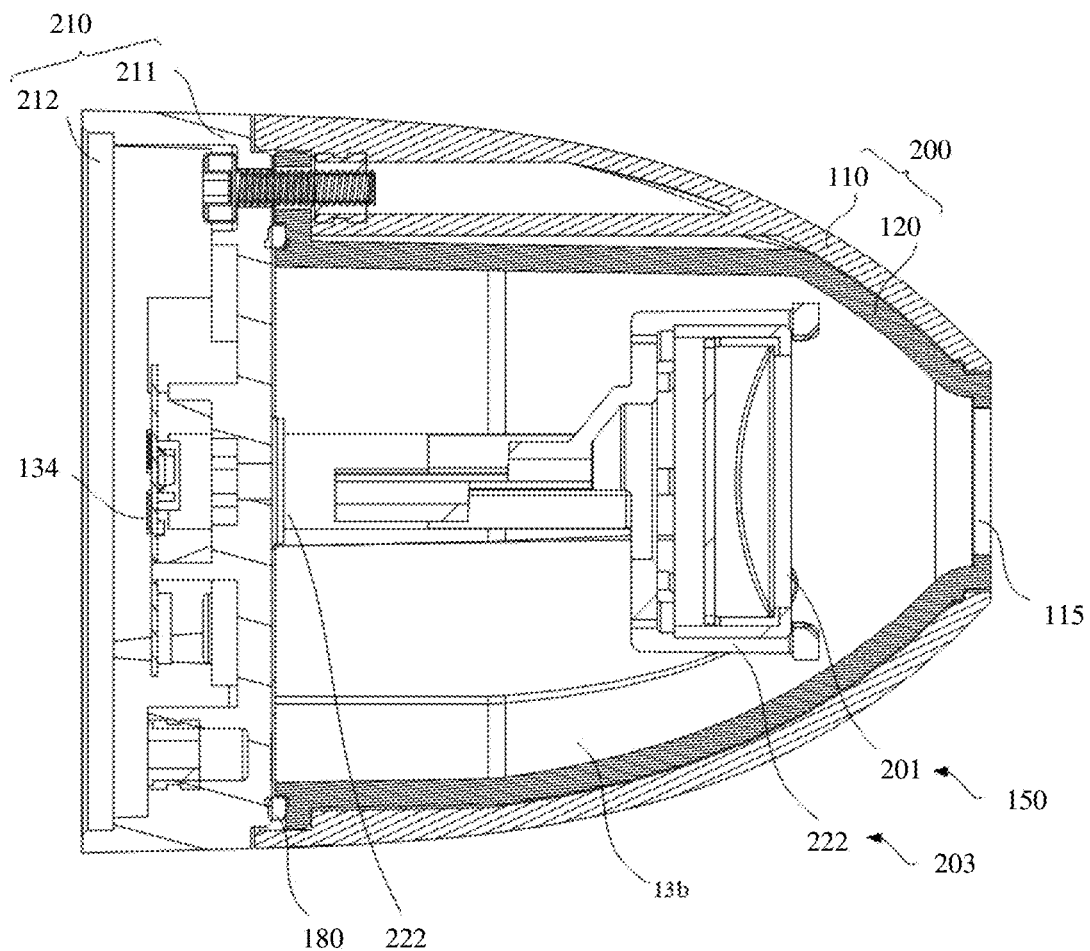
FIG. 6 is a structural exploded view of the ultrasonic treatment tip according to yet another embodiment of the present application.

Referring to FIG. 5 and FIG. 6, in this embodiment, the ultrasonic treatment tip includes a shell 200, a cover 210, an ultrasonic transducer 150 and a compensator. The shell 200 is provided with a first sound-transmitting hole 115, and the sound-transmitting membrane 160 is providing coverage of the first sound-transmitting hole 115. The cover 210 is fixedly coupled with the shell 200, and the cover 210, the sound-guiding membrane 160 and the shell 200 jointly form a sealed accommodation cavity 202. The ultrasonic transducer 150 is provided in the accommodation cavity 202, and a sound emitter 201 of the ultrasonic transducer 150 being faced with the first sound-transmitting hole 115. For example, sound emitter may be the piezoelectric ceramics in ultrasonic transducers, etc. The compensator is provided in the accommodation cavity 202, being protrudable from an inner surface of the accommodation cavity to the sound-transmitting membrane, configured to adjust internal pressure changes in the accommodation cavity 202 when the sound emitter 201 is working. In this way, it can prevent the pressure in the accommodation cavity 202 from acting concentratedly on the sound-guiding membrane 160 and causing the sound-guiding membrane 160 to be damaged, thereby extending the service life of the ultrasonic treatment tip, and improving the use safety of the ultrasonic treatment tip and the effectiveness of ultrasound therapy.

The ultrasonic transducer 150 includes a sound emitter 201 and an emitting surface. The emitting surface faces the first sound-transmitting hole 115, so that the first sound-transmitting hole 115 is located on the conduction path of ultrasonic waves, so that the ultrasonic waves generated by the sound emitter 201 are transmitted to the sound-transmitting membrane 160 by the sound-conducting medium, and are transmitted to the tissue to be treated. Its path is short, which is convenient for reducing the loss of ultrasonic waves and improving the effectiveness of ultrasound therapy.

The accommodation cavity 202 jointly formed and enclosed by the shell 200, the cover 210 and the sound-transmitting membrane 160 is filled with a sound-conducting medium. When the sound emitter 201 of the ultrasonic transducer 150 works, the heat generated causes the temperature in the accommodation cavity 202 to rise, at this time, the sound-conducting medium will expand due to heat, thereby causing pressure in the accommodation cavity 202 change, that is, the internal pressure will also increase subsequently. The accommodation cavity 202 is separated by a compensator to form a buffer chamber, when the sound-conducting medium expands due to heat, the pressure mainly acts on the compensator to slow down the impact brought by the pressure difference, absorbing and offsetting changes in internal pressure, thereby avoiding the concentrated action of pressure on the sound-transmitting membrane 160, which will causes tearing and damage of the sound-transmitting membrane 160 so that the sound-conducting medium in the accommodation cavity 202 flows out, or air enters the accommodation cavity 202, or other phenomena. The sound-conducting medium can be a liquid that can conduct ultrasonic waves, such as water or oil.

Since that the accommodation cavity 202 is enclosed and formed by a shell 200, a cover 210 and a sound-transmitting membrane 160 jointly, in an embodiment, the compensator is fixed on the shell 200 or the cover 210. Certainly, a plurality of compensators can be provided, at this time, the plurality of compensators can be provided on the shell 200 and the cover 210 at the same time, thus further realizing the protection of the sound-transmitting membrane 160, promoting the reliable use of the ultrasonic treatment tip and guaranteeing the therapeutic effect of ultrasonic waves, thereby improving the use safety of the ultrasonic treatment tip and the effectiveness of ultrasound therapy.

In addition, the compensator is provided at the accommodation cavity 202, and the compensator can be fixed to the inner wall surface of the shell 200 or the surface of the cover 210 on a side facing the shell 200 by connection methods such as bonding, or snapping or the like, thus, the structure is simple and the processing is convenient.

Both the shell 200 and the cover 210 are made of hard materials, such as stainless steel, plastic, etc. The sound-transmitting membrane 160 needs to isolate the sound-conducting medium, conduct the ultrasonic waves, and contact the tissue to be treated, so the sound-transmitting membrane 160 is made of elastic materials such as silicone, TPU (Thermoplastic Urethane), TPEE (Thermoplastic Polyester Elastomer), etc.

The shell 200 and the sound-transmitting membrane 160 can be an integrated molding structure, or the sound-transmitting membrane 160 may also be covered on one end of the shell 200 configured for emitting ultrasonic waves by bonding, or the sound-transmitting membrane 160 may be fixed to the connector and provided in the first sound-transmitting hole 115, which is not limited here.

In the technical solution of the present application, the accommodation cavity 202 is separated by a compensator and forms a buffer chamber with the inner surface of the accommodation cavity 202, so as to offset the pressure change in the accommodation cavity 202 when the sound emitter 201 is working. In this way, it can prevent the pressure in the accommodation cavity 202 from acting concentratedly on the sound-transmitting membrane 160 and causing the sound-transmitting membrane 160 to be damaged, thereby extending the service life of the ultrasonic treatment tip, and improving the use safety of the ultrasonic treatment tip and the effectiveness of ultrasound therapy.

As shown in FIG. 5 and FIG. 6, in an embodiment, the compensator is an elastic membrane, the inner surface of the accommodation cavity 202 is provided with a channel communicable with external environment, the elastic membrane is fixedly connected to the inner surface of the accommodation cavity 202 and forms a buffer chamber communicable with the channel, and the elastic membrane is configured to deform and squeeze the air in the buffer chamber to outside when the internal pressure in the accommodation cavity 202 changes. In this way, since the elastic membrane is elastic, when the sound-conducting medium expands due to heat, the elastic membrane is easily squeezed and deformed. Moreover, since the buffer chamber communicates with the outside atmosphere, the elastic membrane deforms and squeezes the buffer chamber, and squeezes the air inside the buffer chamber to the external environment at the volume expanded by the sound-conducting medium, thereby keeping the internal pressure between the accommodation cavity 202 and the buffer chamber approximately equal, avoiding the phenomenon that the pressure in the accommodation cavity 202 concentrates on the sound-transmitting membrane 160 and thus causing excessive deformation to tearing, realizing the protection of the sound-transmitting membrane 160, and improving the reliability and use safety of the ultrasonic treatment tip.

The elastic membrane is made of elastic material and has the function of blocking water and air, thus preventing the sound-conducting medium inside the accommodation cavity 202 from flowing into the buffer chamber and flowing to the external environment, guaranteeing the sealing performance of the accommodation cavity 202, improving the use safety of the ultrasonic treatment tip, and improving the effectiveness of ultrasonic treatment.

More specifically, in an embodiment, an elastic coefficient of the elastic membrane is smaller than an elastic coefficient of the sound-transmitting membrane 160. In other words, the elastic membrane and the sound-transmitting membrane 160 can be made of the same materials or different materials. The elastic membrane is more susceptible to deformation due to extrusion than the sound-transmitting membrane 160. Therefore, when the pressure in the accommodation cavity 202 increases, the elastic membrane will first deform to adapt to the internal pressure change, thus preventing large pressure from acting on the sound-transmitting membrane 160 and causing excessive deformation or even tearing of the sound-transmitting membrane 160. In this way, the protection of the sound-transmitting membrane 160 can be realized, and use reliability and use safety of the ultrasonic treatment tip are improved.

In an embodiment, the compensator is provided in the accommodation cavity away from the first sound-transmitting hole 115. In this way, it can be avoided that the compensator is located in the sound guide area between the ultrasonic transducer 150 and the sound-transmitting membrane 160, thus affecting the conduction of ultrasonic waves, that is, the fixed position of the compensator can be the area where the shell 200 is close to the cavity wall of the cover 210. For example, as shown in FIG. 6, the end surface of the ultrasonic transducer 150 away from the cover 210 is configured as the interface, and a compensator can be fixed at any position on the wall surface between the interface and the cover 210.

Furthermore, referring to FIG. 5 and FIG. 6, in an embodiment, the shell 200 includes an inner shell 120 and an outer shell 110 fixedly connected with each other, the inner shell 120 is connected to the compensator and is sealedly connected to the cover 210, and the outer shell 110 is sleeved on an outside of the inner shell 120. It can be understood that the inner shell 120 and the cover 210 are sealed and fixed to form an accommodation cavity 202, which can be fixed by bolt connection, snap connection or other connection methods. At this time, the compensator is provided in the inner shell 120, the outer shell 110 is sleeved on the outside of the inner shell 120, and they can be fixed as a whole by fastening, screw connection, etc. In addition, the outer shell 110 can play the role of supporting and protecting the inner shell 120, thus preventing the inner shell 120 from being deformed under pressure, further extending the service life of the inner shell 120 and the use reliability of the ultrasonic treatment tip.

When the buffer chamber formed and enclosed by the compensator and the inner shell 120 communicates with the external environment, it only need to provide a through hole to penetrate the inner shell 120 and the outer shell 110. At this time, the buffer chamber is connected to the outside atmosphere via the through hole, and the internal pressure of the buffer chamber is approximately the same as the atmospheric pressure.

Furthermore, referring to FIG. 5 and FIG. 6, in an embodiment, a sealing ring 180 is clamped between the inner shell 120 and the cover 210. In this way, it can guarantee the sealing performance of the accommodation cavity 202, thus reducing the sound-conducting medium from overflowing the accommodation cavity 202 via the connection gap between the inner shell 120 and the cover 210, and reducing the outside air from flowing into the accommodation cavity 202 via the connection gap between the inner shell 120 and the cover 210.

Specifically, in an embodiment, the cover 210 includes a bottom cover 211 and a top cover 212 fixedly connected with each other, the bottom cover 211 is sealedly connected to the inner shell 120, an installation cavity formed by the connection of the top cover 212 and the bottom cover 211 is provided with a circuit board 230, and the circuit board 230 is electrically connected to the ultrasonic transducer 150. It can be understood that, the bottom cover 211 and the inner shell 120 are sandwiched by a sealing ring 180 to ensure that the bottom cover 211 and the inner shell 120 are connected to form a sealed accommodation cavity 202. The ultrasonic transducer 150 is fixed at the bottom cover 211 and is electrically connected to the circuit board 230 in the installation cavity, so that the ultrasonic transducer 150 can be driven to emit ultrasonic waves to achieve the purpose of treatment. The circuit board 230 is provided in the installation cavity, which can reduce the risk of corrosion, damage, etc., thus ensuring the reliable use of the ultrasonic treatment tip.

Referring to FIG. 5 and FIG. 6, in an embodiment, the ultrasonic treatment tip further includes a bracket 203, that has one end fixedly connected to the cover 210 and the other end fixedly connected to the ultrasonic transducer 150. It can be understood that the bracket 203 is provided with a fixed part 221 and a clamping part 222. The fixed part 221 is fixedly connected to the cover 210 and can be fixed into one body by snapping, plugging, welding or other connection methods. The clamping part 222 is provided with a clamping hole, and the ultrasonic transducer 150 is embedded in the clamping hole to achieve reliable fixation.

In an embodiment, a through hole is provided at the cover 210. In this way, on the one hand, it can avoid that the compensator is located in the sound guide area between the ultrasonic transducer 150 and the sound-transmitting membrane 160, which will affects the conduction of ultrasonic waves. On the other hand, it facilitates the processing of through holes and simplifies the processing technology.

Figure 7:
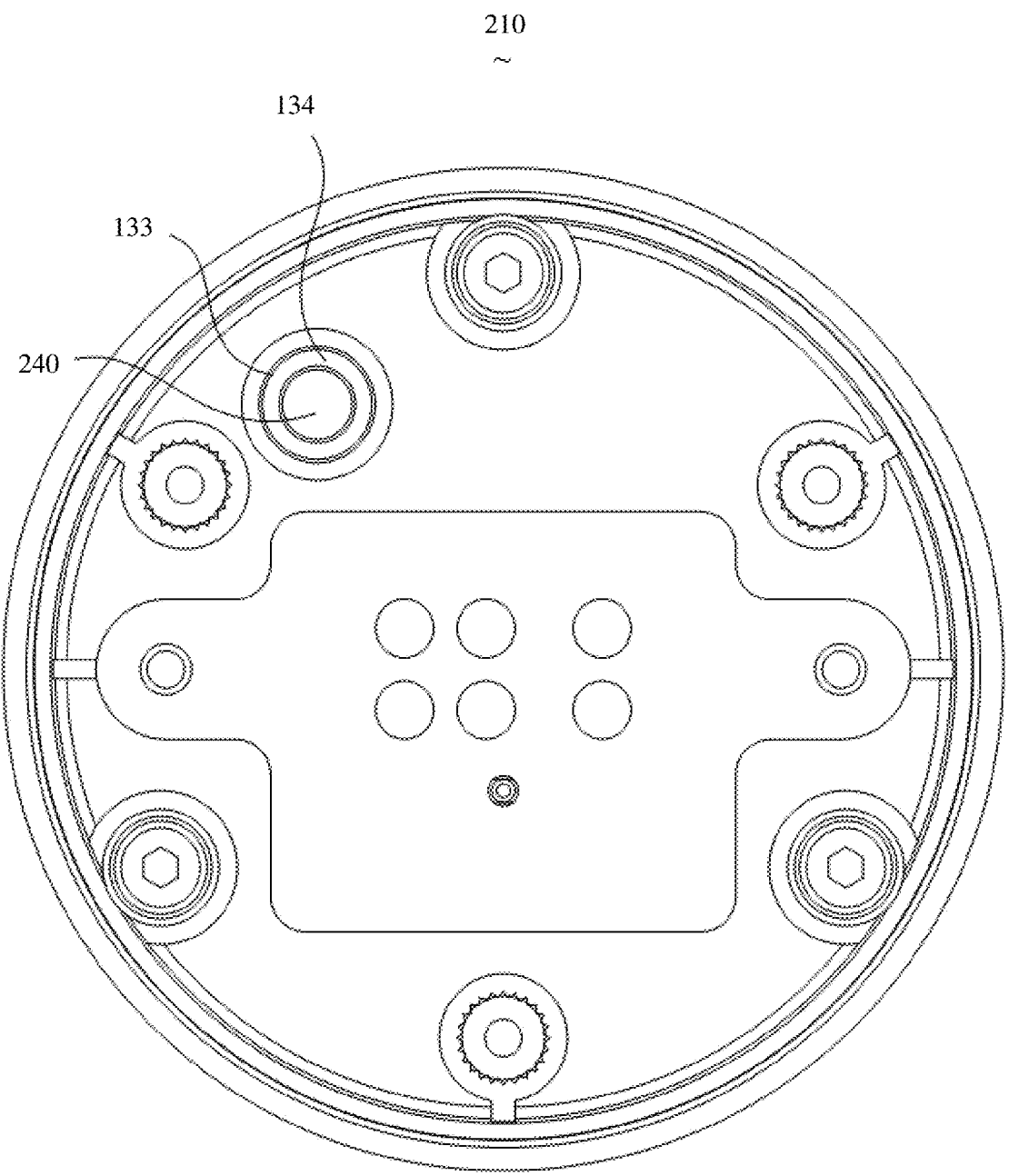
FIG. 7 is a structural cross-sectional view of the ultrasonic treatment tip in FIG. 6.

Furthermore, referring to FIG. 7, in an embodiment, the cap 210 is provided with an injection hole 133, the injection hole 133 is pluggable with a sealing plug 134, and the through hole is opened on the sealing plug 134. In this way, on the one hand, the existing injection hole 133 can be used to simplify the processing technology and reduce the number of holes opened on the cap 210, which is beneficial to improve the structural strength of the cap 210 and guarantee the sealing performance of the reservoir 202. On the other hand, the through hole is opened on the sealing plug 134, at this time, the elastic membrane 240 covers the sealing plug 134 and seals the through hole, which facilitates the replacement of the sound-transmitting membrane 160, ensures the normal operation of the compensation function of the compensator, reduces the risk of damage of the elastic membrane 240 under long-term use, thereby improving the use reliability and use safety of the ultrasonic treatment tip.

Specifically, in an embodiment, the cap 210 can be assembled from a bottom cap 211 and a top cap 212. At this time, the bottom cap 211 is fixedly connected to the shell and forms an reservoir 202, and the injection hole 133 is provided at the bottom cap 211. The bottom cap 211 and the top cap 212 are connected to form an installation cavity, the installation cavity is configured to place electronic parts such as circuit boards or the like, which can prevent electronic parts from being corroded and affecting the normal operation of the ultrasonic transducer 150.

Specifically, in an embodiment, the sealing plug 134 includes a plug body, a supporting frame provided at an outer periphery of the plug body, and the through hole is opened on the plug body, and the supporting frame is sealedly connected to the injection hole 133. In this way, on the one hand, by the setting of the supporting frame, while improving the overall compressive deformation resistance of the sealing plug 134 and conveniently sealing the injection hole 133, it avoids that the pressure in the reservoir 202 is too high, which deforms the sealing plug 134 and reduces the sealing performance of the reservoir 202. On the other hand, it is convenient to open a through hole in the plug body to realize the covering of the elastic membrane 240, and it further seals the injection hole 133 with the installation of the sealing plug 134, so as to guarantee the sealing performance of the reservoir 202. Moreover, it is advantageous to replace the elastic membrane 240 while replacing the sealing plug 134, thus ensuring that the elastic performance of the elastic membrane 240 can adapt to repeated changes in pressure.

Furthermore, a surface of the supporting frame is coated with an elastic layer. The elastic layer is made of elastic materials, such as silicone rubber. The elastic layer is abutted against the injection hole 133, which is beneficial to improving the sealing performance of the reservoir 202 and improving the connection strength of the sealing plug 134.

As shown in FIG. 7, in an embodiment, the compensator includes an elastic membrane 240, the elastic membrane 240 is provided in the housing 200 and is fixedly connected to the cap 210, and the elastic membrane 240, the cap 210 and the sound-transmitting membrane 160 are enclosed to form the reservoir 202. The shell 200 can be sealed and fixed with the cap 210 by bolting, snapping, etc. The elastic membrane 240 can be connected to the shell 200 by bonding, snapping, etc. Furthermore, the elastic membrane 240, the cap 210 and the sound-transmitting membrane 160 can jointly enclose an reservoir 202, and the reservoir 202 is filled with a sound-conducting medium. In this way, when the pressure in the reservoir 202 changes, that is, the sound-conducting medium expands due to heat, and by squeezing the elastic membrane 240, the expansion amount causes the elastic membrane 240 to balance and absorb pressure changes in the reservoir 202 by deformation, thereby protecting the sound-transmitting membrane 160.

Figure 8:
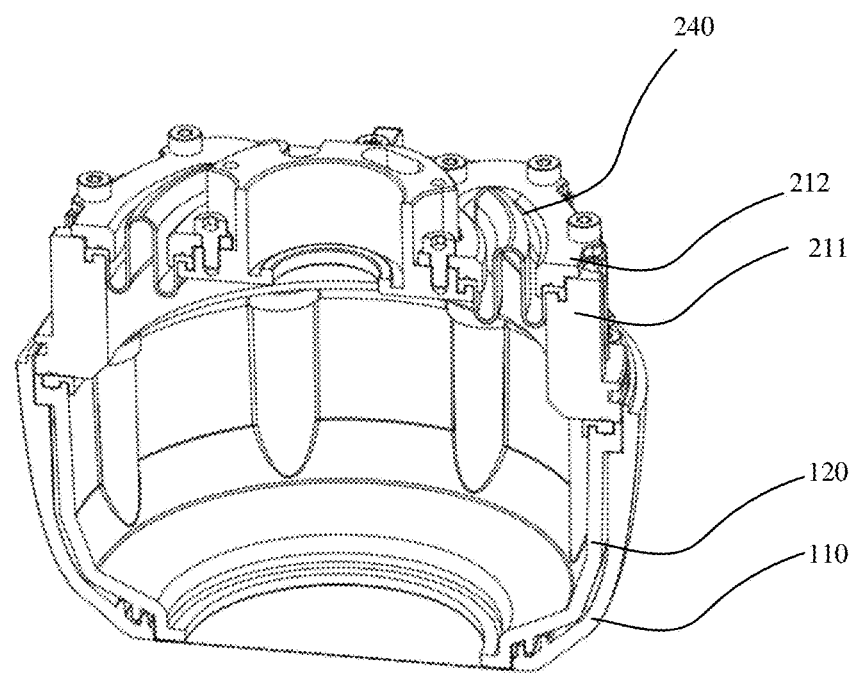
FIG. 8 is a structural cross-sectional view of the ultrasonic treatment tip according to yet another embodiment of the present application.

Furthermore, referring to FIG. 8, in an embodiment, the cap 210 may be assembled from a bottom cap 211 and a top cap 212, at this time, the bottom cap 211 is fixedly connected to the shell, A compensation hole extending along the arc direction can be provided at the region between the center of the top cap 212 and the edge of the top cap 212. The compensation hole can be symmetrically provided around the center of the cap, A groove is provided at a place where the bottom cap 211 and the top cap 212 cover. In an embodiment, the elastic membrane 240 can be a pleated elastic stretchable membrane. The edge of the elastic membrane 240 is fitted into the groove of the bottom cap 211. At this time, the elastic membrane 240 seals the compensation hole. It is understandable that the elastic membrane 240 is provided like this, the elastic membrane 240 is enclosed with the cap 210 and the sound-transmitting membrane 160 to form an reservoir 202 that can withstand a wider range of pressure changes than the above-mentioned embodiment.

The present application further proposes a therapeutic instrument. The therapeutic instrument includes the ultrasonic treatment tip 100 and a handle. The handle is detachably connected to the ultrasonic treatment tip 100. The specific structure of the ultrasonic treatment tip 100 refers to the above embodiment. Since the therapeutic instrument adopts all the technical solutions of all the above embodiments, it has at least all the beneficial effects brought by the technical solutions of the above embodiments, which will not be described again here. The handle can be connected to other detachable probe probes for corresponding treatment work, thus realizing "one machine with multiple functions", reducing time cost, space cost and equipment procurement costs, while also improving the convenience of treatment.

The above are only some embodiments of the present application, and are not intended to limit the scope of the present application. Under the concept of the present application, any equivalent structure transformation made by utilizing the description and accompanying drawings of the present application, or directly or indirectly applied in other related technical fields, is included within the scope of the present application.

What is claimed is:

1. An ultrasonic treatment tip, comprising:
   a shell, provided with a first sound-transmitting hole;
   a sound-transmitting membrane, providing coverage of the first sound-transmitting hole; and
   a cover, fixedly coupled with the shell,
   wherein the cover, the sound-transmitting membrane and the shell are configured to jointly form a sealed accommodation cavity; and the ultrasonic treatment tip further comprises:
   an ultrasonic transducer, provided in the sealed accommodation cavity, a sound emitter of the ultrasonic transducer being faced with the first sound-transmitting hole; and
   a compensator provided in the sealed accommodation cavity, configured to adjust internal pressure changes in the accommodation cavity when the sound emitter is working;
   wherein the shell comprises an inner shell and an outer shell fixedly connected with each other; the inner shell is connected to the compensator and is sealedly connected to the cover, and the outer shell is sleeved on outside the inner shell;
   a sealing ring is clamped between the inner shell and the cover.

2. The ultrasonic treatment tip according to claim 1, wherein the compensator is an elastic membrane, and the elastic membrane is fixedly connected to the inner surface of the accommodation cavity and configured to form a sealed buffer chamber with the inner surface of the accommodation cavity; the elastic membrane is configured to deform and squeeze air in the buffer chamber when the internal pressure in the accommodation cavity changes; and/or
   the compensator is an elastic membrane; the inner surface of the accommodation cavity is provided with a channel communicable with external environment, and the elastic membrane is fixedly connected to the inner surface of the accommodation cavity and configured to form a buffer chamber communicable with the channel; the elastic membrane is configured to deform and squeeze air in the buffer chamber to outside when the internal pressure in the accommodation cavity changes; and/or
   an elastic coefficient of the elastic membrane is smaller than an elastic coefficient of the sound-transmitting membrane; and/or
   the compensator is provided in the accommodation cavity away from the first sound-transmitting hole.

3. The ultrasonic treatment tip according to claim 1, wherein
   the cover comprises a bottom cover and a top cover fixedly connected with each other, and the bottom cover is sealedly connected to the inner shell; an installation cavity formed by the connection of the top cover and the bottom cover is provided with a circuit board, and the circuit board is electrically connected to the ultrasonic transducer.

4. The ultrasonic treatment tip according to claim 1, wherein the compensator further comprises a waterproof and gas-penetration membrane.

5. The ultrasonic treatment tip according to claim 1, wherein the compensator further comprises a micro pressure relief valve.

6. The ultrasonic treatment tip according to claim 1, wherein the compensation member further comprises a column-shaped pressure piston.

7. A therapeutic instrument, comprising:
   the ultrasonic treatment tip according to claim 1; and
   a handle detachably connected to the ultrasonic treatment tip.

8. An ultrasonic treatment tip, comprising:
   an outer shell comprising a workspace and a first sound-guiding hole;
   an inner cover provided with an assembly hole;
   an inner shell provided with a second sound-guiding hole and a connecting end, wherein the inner cover is fixedly connected to the connecting end and configured to limit a compartment with the inner shell, and the first sound-guiding hole and the second sound-guiding hole are configured to form a sound-guiding channel;
   a sound-guiding membrane covering the second sound-guiding hole; and
   a buffer member defining a buffer cavity, wherein
   the buffer member is protrudable in the compartment; the buffer member has an opening, and the opening is fixedly connected to the assembly hole; the buffer cavity is communicable with the workspace via the opening;
   the compartment is provided with an ultrasonic transducer and is filled with a sound medium; a distance is provided between the ultrasonic transducer and the second sound-guiding hole, and the sound-guiding channel is configured to transmit sound waves generated by the ultrasonic transducer; and
   the inner cover, the inner shell, the sound-guiding membrane and the buffer are provided in the workspace;
   wherein the ultrasonic treatment tip further comprises a sealing ring, the inner shell comprises a second flange provided around the connecting end; the sealing ring is provided at the second flange, and the inner cover is configured to press the sealing ring and is fixedly connected to the second flange.

9. The ultrasonic treatment tip according to claim 8, wherein the buffer member comprises one or more pleated structures.

10. The ultrasonic treatment tip according to claim 8, wherein the buffer member comprises a first flange, and the first flange encircles the opening; and
    the first flange is fixedly connected to a periphery of the assembly hole.

11. The ultrasonic treatment tip according to claim 10, wherein the first flange is connected to a surface of the inner cover facing away from a side of the compartment.

12. The ultrasonic treatment tip according to claim 11, wherein the inner cover is provided with a limiting groove surrounding the assembly hole, and the limiting groove is configured to place the first flange.

13. The ultrasonic treatment tip according to claim 10, further comprising:
    a pressing piece configured to press the first flange and fixedly connected to the inner cover;
    wherein the pressing piece is further provided with an outlet hole; the outlet hole is connected to the assembly hole and the opening, and the outlet hole is configured to communicate with the buffer cavity and the workspace.

14. An ultrasonic treatment tip, comprising:
a housing, provided with a first sound-conducting hole;
a sound-conducting membrane, providing coverage of the first sound-conducting hole;
a cap, fixedly coupled with the housing;
wherein the cap, the sound-conducting membrane and the housing are configured to jointly form a sealed reservoir; and the ultrasonic treatment tip further comprises:
an ultrasonic transducer, provided in the reservoir, the ultrasonic transducer having a sound emitter being faced with the first sound-conducting hole; and
a compensator, provided on one of the housing and the cap, configured to adjust internal pressure changes in the reservoir when the sound emitter is working;
wherein the compensator comprises a through hole and an elastic membrane; the elastic membrane is configured to cover the through hole, and the elastic membrane is configured to deform when the internal pressure in the reservoir changes;
wherein the through hole is opened on the cap, and the cap is provided with an injection hole; the injection hole is pluggable with a sealing plug, and the through hole is opened on the sealing plug.

15. The ultrasonic treatment tip according to claim 14, wherein the sealing plug comprises a plug body, a supporting frame is provided on an outer periphery of the plug body, and the through hole is opened on the plug body; the supporting frame is sealedly connected to the injection hole; and
a surface of the supporting frame is coated with an elastic layer.

16. The ultrasonic treatment tip according to claim 14, wherein the compensator comprises an elastic membrane; the elastic membrane is provided in the housing and is fixedly connected to the cap, and the elastic membrane, the cap and the sound-conducting membrane are enclosed to form the reservoir.

17. The ultrasonic treatment tip according to claim 14, wherein the cap is further provided with a compensation hole; the compensator comprises an elastic membrane; the elastic membrane is sealedly connected to the compensation hole; the elastic membrane, the cap and the sound-conducting membrane are enclosed to form the reservoir.

* * * * *